(12) United States Patent
Spiegelman et al.

(10) Patent No.: US 11,487,528 B1
(45) Date of Patent: Nov. 1, 2022

(54) MANAGING SYSTEM UPGRADES IN A NETWORK COMPUTING ENVIRONMENT

(71) Applicant: EMC IP Holding Company LLC, Hopkinton, MA (US)

(72) Inventors: Roman Spiegelman, Yokneam Illit (IL); Rivka Matosevich, Zichron Ya'acov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/382,440

(22) Filed: Jul. 22, 2021

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ...................... G06F 8/65; G06F 8/71
See application file for complete search history.

(56) References Cited

U.S. PATENT DOCUMENTS

| | | | | |
|---|---|---|---|---|
| 7,260,818 B1* | 8/2007 | Iterum | ...................... | G06F 8/71 717/172 |
| 2003/0074426 A1* | 4/2003 | Dervin | ...................... | H04L 9/40 709/205 |

OTHER PUBLICATIONS

Zhang et al, "Fast and Scalable VMM Live Upgrade in Large Cloud Infrastructure", [Online], 2019, pp. 93-105, [Retrieved from internet on Aug. 4, 2022], <https://dl.acm.org/doi/pdf/10.1145/3297858.3304034> (Year: 2019).*
B. Awerbuch et al., "Distributed BFS Algorithms," Extended Abstract, 26th Annual Symposium on Foundations of Computer Science, 1985, 7 pages.
B. Awerbuch, "A New Distributed Depth-First-Search Algorithm," Information Processing Letters, vol. 20, 1985, 4 pages.

* cited by examiner

*Primary Examiner* — S. Sough
*Assistant Examiner* — Zengpu Wei
(74) *Attorney, Agent, or Firm* — Ryan, Mason & Lewis, LLP

(57) ABSTRACT

Techniques are provided for managing system upgrades in a network computing environment. For example, a method includes managing an upgrade of a system within a cluster of systems which communicate in a network computing environment system to implement a distributed application. The system performs an upgrade operation to upgrade a current version of the system to a new software version number which comprises a new feature. The system performs a cluster version update process to communicate with other systems in the cluster to determine a cluster version number of the cluster. The system enables the new feature of the new software version if the new software version number is not greater than the determined cluster version number of the cluster.

21 Claims, 7 Drawing Sheets

MANAGING SYSTEM UPGRADES IN A NETWORK COMPUTING ENVIRONMENT

TECHNICAL FIELD

This disclosure relates generally to techniques for managing a network computing environment and, more particularly, to techniques for managing system upgrades in a network computing environment.

BACKGROUND

A network computing environment may have multiple systems that communicate in a distributed and coordinated manner to perform functions. For example, in a data storage system which comprises network connected storage nodes that implement a distributed data replication system, the storage nodes can host respective replication systems which are logically configured in a given replication topology. The replication systems that operate on the different storage nodes will communicate to perform data replication functions in which primary data stored on a given storage node is replicated to one or more storage nodes based on the given replication topology. In a network computing environment, the communicating systems should have software versions that are compatible to enable proper functionality. For example, there can be a circumstance in which a given system within the network computing environment is upgraded to a newer software version which has certain features and functions that are not compatible with one or more previous software versions that are implemented by other systems in the environment. In this regard, various system errors or degraded system performance may result when the systems within the computing environment operate with different software versions of the given software platform.

SUMMARY

Exemplary embodiments of the disclosure include techniques for managing system upgrades in a network computing environment. For example, in an exemplary embodiment, a method comprises managing an upgrade of a first system within a cluster of systems which communicate in a network computing environment system to implement a distributed application. The first system performs an upgrade operation to upgrade a current version of the first system to a new software version number which comprises a new feature. The first system performs a cluster version update process to communicate with other systems in the cluster to determine a cluster version number of the cluster. The first system enables the new feature of the new software version, if the new software version number is not greater than the determined cluster version number of the cluster.

Other embodiments of the disclosure include, without limitation, systems and articles of manufacture comprising processor-readable storage media, which are configured to manage system upgrades in a network computing environment.

DETAILED DESCRIPTION

Exemplary embodiments of the disclosure will now be discussed in further detail with regard to systems and methods for managing system upgrades in a network computing environment. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
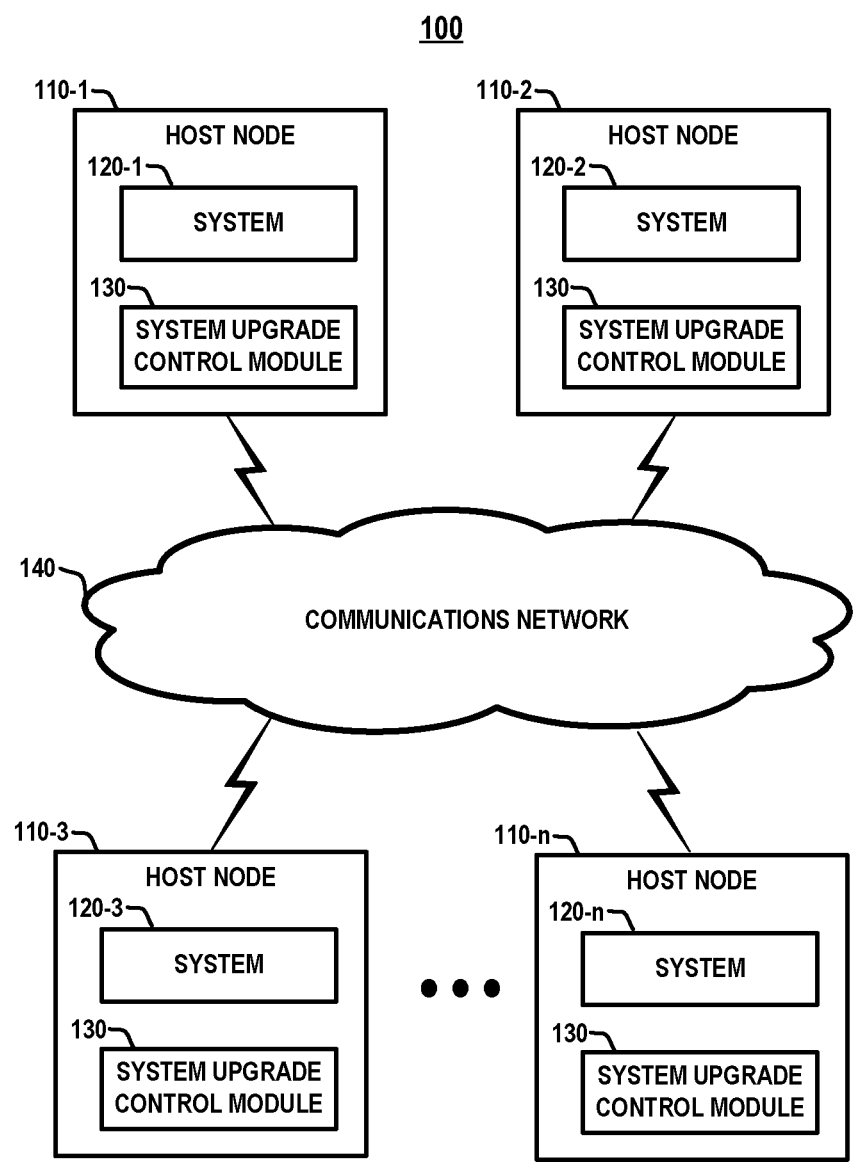
FIG. 1 schematically illustrates a network computing environment which implements a distributed software system that is configured to manage upgrades of constituent systems hosted by different nodes of the computing environment, according to an exemplary embodiment of the disclosure.

FIG. 1 schematically illustrates a network computing environment which implements a distributed software system that is configured to manage upgrades of constituent systems hosted by different nodes of the computing environment, according to an exemplary embodiment of the disclosure. In particular, FIG. 1 schematically illustrates a network computing system 100 which comprises a plurality of host nodes 110-1, 110-2, 110-3, . . . , 110-n (collectively, host nodes 110). The host nodes 110-1, 110-2, 110-3, . . . , 110-n comprise respective systems 120-1, 120-2, 120-3, . . . 120-n (collectively, systems 120), and system upgrade control modules 130, the functions of which will be explained in further detail below. The host nodes 110-1, 110-2, 110-3, . . . , 110-n are network connected via a communications network 140.

The network computing system 100 can be any type of computing environment such as a distributed computing environment, an enterprise computing environment, a cloud computing environment, or any other type of computing system or information processing systems with multiple nodes that implement a distributed software platform for a given solution. For example, in some embodiments, the host nodes 110 comprise a cluster of compute nodes that perform computational work in the cluster. More specifically, in some embodiments, the host nodes 110 comprise physical server nodes and/or virtual server nodes which host and execute the systems 120 (e.g., software systems) that are configured to process data and execute tasks/workloads and perform computational work, in a distributed manner, to thereby provide compute services to one or more users (the term "user" herein is intended to be broadly construed so as to encompass numerous arrangements of human, hardware, software or firmware entities, as well as combinations of such entities). The host nodes 110 can include virtual nodes such as virtual machines and container systems that perform computational work.

Further, in some embodiments, the host nodes 110 comprise storage nodes in a distributed data storage system, wherein the storage nodes manage and control access to storage arrays (homogenous arrays or heterogenous arrays of storage devices). In such embodiments, the storage nodes are configured to communicate in a cooperative manner to perform functions such as e.g., processing data access requests, aggregating/pooling the storage capacity of storage device arrays of the storage nodes, performing data management and storage services such as data deduplication, and data protection functions such as data replication, snapshot, and data protection and resiliency schemes based on data striping and/or parity (e.g., erasure coding, RAID, etc.), and other types of data management functions, depending on the system configuration.

The communications network 140 is configured to enable communication between the host nodes 110. While the communications network 140 is generically depicted in FIG. 1, it is to be understood that the communications network 140 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Internet Protocol (IP)-based or Fibre Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniB and, Gigabit Ethernet, etc., to implement I/O channels and support storage network connectivity. Numerous alternative networking arrangements are possible in a given embodiment, as will be appreciated by those skilled in the art.

In the exemplary embodiment of FIG. 1, the systems 120-1, 120-2, 120-3, . . . 120-n are software systems that are configured to implement a distributed software platform for a given application or solution. For example, in some embodiments, the systems 120-1, 120-2, 120-3, . . . 120-n comprise instances of a container software platform, a virtual machine platform, a distributed operating system, etc., which execute on the host nodes 110-1, 110-2, 110-3, . . . , 110-n (operating as compute nodes). In some embodiments, the systems 120-1, 120-2, 120-3, . . . 120-n comprise instances of a data management service or software-defined storage control system, which execute on respective host nodes 110-1, 110-2, 110-3, . . . , 110-n (operating as storage nodes). For example, in some embodiments, the systems 120-1, 120-2, 120-3, . . . 120-n comprise instances of a distributed data replication system (e.g., asynchronous journal-based replication system), or a data deduplication system, etc., which execute on storage nodes.

The system upgrade control modules 130 execute on the host nodes 110 and are configured to control software upgrade operations of the respective systems 120-1, 120-2, 120-3, . . . 120-n in a manner which ensures compatibility between groups of systems that interact and communicate with each other in the network computing system 100. The system upgrade control modules 130 can be implemented (i) as standalone software control programs, (ii) as constituent modules of the software systems 120, or (iii) as modules of an operating system (OS) of the host nodes 110, etc. In exemplary embodiments in which the systems 120-1, 120-2, 120-3, . . . 120-n comprise a software application, each system 120-1, 120-2, 120-3, . . . 120-n will have an associated version number which is used to track iterations of the software application, including, e.g., upgrades, updates, and patches.

In some embodiments, as is known in the art, a software version number is represented as a series of numbers separated by periods. For example, semantic versioning is a formal convention for specifying a three-part version number as follows: major.minor.patch, e.g., 3.0.0, 3.2.0, 3.2.5, etc. The major number in the version number represents major upgrades to the software application, e.g., increasing from version 2.0 to version 3.0 is considered a major upgrade. Typically, the major version number is incremented for newly added application programming interface (API) features and/or changed API features which are not backward compatible with older versions of the software application. The minor number of the version number is incremented for software releases which add new, but backward-compatible, API features. The patch number of the version number is incremented for minor changes and bug fixes which do not change the API features of the software application. Typically, a new software application is configured to be backward compatible, wherein the new software application is designed to interact correctly with older versions of the software application, and the most recent version. It is to be understood that the term "upgrade" as used herein is meant to broadly include all types of major and minor upgrades and updates to a given software system.

In the network computing system 100, it is assumed that the number (n) of systems 120-1, 120-2, 120-3, . . . 120-n can dynamically vary over time as host nodes are added or removed from the network computing system 100. Furthermore, although the host nodes 110-1, 110-2, 110-3, . . . , 110-n are all network connected via the communications network 140, at any given point in time, the systems 120-1, 120-2, 120-3, . . . 120-n may be divided into different clusters or groups of systems to perform a given function, wherein system membership in such groups can change over time. For example, in a data storage system, a subset of the storage nodes can be assigned as members of a given replication group which participate in the replication of a given storage volume. Moreover, the systems 120-1, 120-2, 120-3, . . . 120-n are configured to perform upgrades in an autonomous manner without a centralized control node coordinating system upgrades to ensure version compatibility of the systems. As explained in further detail below, the system upgrade control modules 130 for the respective systems 120-1, 120-2, 120-2, ..., 120-n are configured to manage and control upgrade operations of the associated systems 120-1, 120-2, 120-3, ... 120-n.

Figure 2:
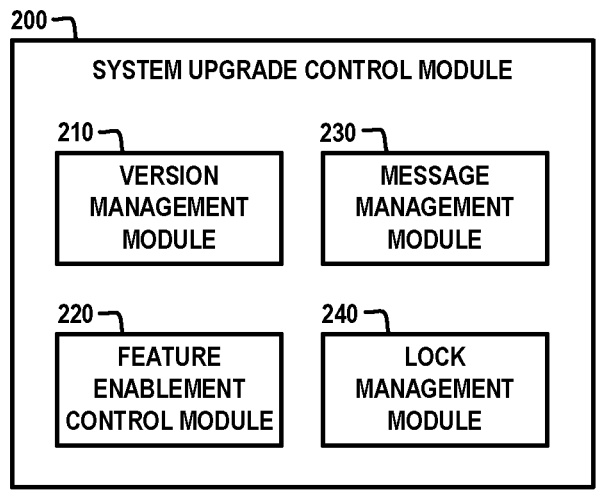
FIG. 2 schematically illustrates a system upgrade control module which is configured to control upgrade operations of a software system, according to an exemplary embodiment of the disclosure.

FIG. 2 schematically illustrates a system upgrade control module 200 which is configured to control upgrade operations of a software system, according to an exemplary embodiment of the disclosure. In some embodiments, FIG. 2 illustrates an exemplary embodiment of the system upgrade control modules 130 in the network computing system 100 of FIG. 1. The system upgrade control module 200 comprises a version management module 210, a feature enablement control module 220, a message management module 230, and a lock management module 240. The system upgrade control module 200 is configured to manage and control autonomous upgrade operations of a given software system associated with the system upgrade control module 200.

In particular, the version management module 210 is configured to perform functions including, but not limited to, performing software upgrade operations to upgrade the software version of the given system, tracking the current software version of the given system, and maintaining and updating a value of a cluster_version property of a given cluster or group of systems which comprise the given system. In particular, each system maintains a cluster_version property. The cluster_version property held by a given system guarantees that the current software version numbers of all systems that are reachable from the given system are at least the value of the cluster_version property. The value of the cluster_version property can increase over time as systems are upgraded to newer software versions.

The feature enablement control module 220 is configured to control the activation of system features when the given system is upgraded to a newer software version. In particular, when the given system is upgraded to a newer version having one or more new API features, the feature enablement control module 220 will activate the new feature(s) of the new software version of the given system if each system in the network computing environment, which is reachable by the given system, has a software version that is greater than or equal to the new software version of the given system. On the other hand, the feature enablement control module 220 will not activate the new feature(s) of the new software version of the given system if there is at least one system in the network computing environment, which is reachable by the given system, having a current software version which is less than the new software version of the given system.

The message management module 230 is configured to generate and process messages that are exchanged with the system upgrade control modules of other software systems to coordinate and manage system upgrades of groups of interacting software systems. More specifically, the message management module 230 is configured to implement a messaging protocol which allows a given system to (i) determine the current software version numbers of all systems that are reachable by the given system, (ii) utilize such information to determine an updated cluster version number for a cluster comprising the given system and the other reachable systems within the cluster, and (iii) broadcast the updated cluster version number property to the reachable systems so that such systems can update the value of the respective cluster_version property accordingly.

In addition, the messaging protocol implemented by the message management module 230 is configured to obtain certain "guarantees" from each system which is a current member of a given cluster or group of systems. For example, in some embodiments, as part of a cluster version update process, the system upgrade control module 200 of a given system will request a first guarantee (alternatively referred to as phase 1 guarantee) from each system, which is reachable from the given system in the cluster, that the system will not allow any new system to connect to the cluster during the cluster version update process until the first guarantee is removed by notice from the given system. In some embodiments, following the cluster version update process, the system upgrade control module 200 of the given system will request a second guarantee from each system, which is reachable from the given system in the cluster, that the system will not allow any new system to connect to the cluster which has a software version that is lower than (e.g., older than) the value of the updated cluster version number that was determined as a result of the cluster version update process. An exemplary cluster version update process will be discussed in further detail below in conjunction with FIG. 4.

In some embodiments, the first guarantee essentially places a "lock" on a given system to prevent the given system from connecting to any new system, irrespective of software version number of the new system, until the given system is "unlocked" by proper removal of the first guarantee. The lock management module 240 is configured to enforce the first and second guarantees. For example, the lock management module 240 enforces the first guarantee of a given system by preventing the given system from connecting to a new system, or otherwise allowing the new system to connect to the given cluster, until the first guarantee is properly removed. In some embodiments, the first guarantee is removed by notice from the system which initiated the cluster version update process and requested such guarantee. In some embodiments, the lock management module 240 implements methods to initiate a guarantee removal process, which allows the system to actually "self-unlock" and remove the first guarantee under certain circumstances in which the given system has not the received permission to remove the first guarantee from the system which initiated the cluster version update process and requested such guarantee. Exemplary embodiments for implementing "self-unlock" processes for removing guarantees will be discussed in further detail below in conjunction with FIGS. 5 and 6.

In accordance with exemplary embodiments of the disclosure, a cluster or group of systems which communicate to implement a given function can be represented as a graph of nodes which are connected by edges, wherein each node represents a system, and wherein an edge between two nodes represents that the two systems (nodes) communicate with each other in the cluster. In particular, an edge between a first system and a second system means that the first system can change the state of the second system, and/or the second system can change the state of the first system. In this regard, an edge between two nodes can be unidirectional or bidirectional. Furthermore, in the context of the exemplary embodiments discussed, a first system (first node) is deemed "reachable" from a second system (second node) if there exists a path in the cluster (node graph) from the first system to the second system, wherein such path comprises a sequence of one or more distinct edges and nodes from the first system to the second system. In other words, in the context of a graphs of nodes, first node may be reached by a second node in the graph by traversing one or edges.

Figure 3:
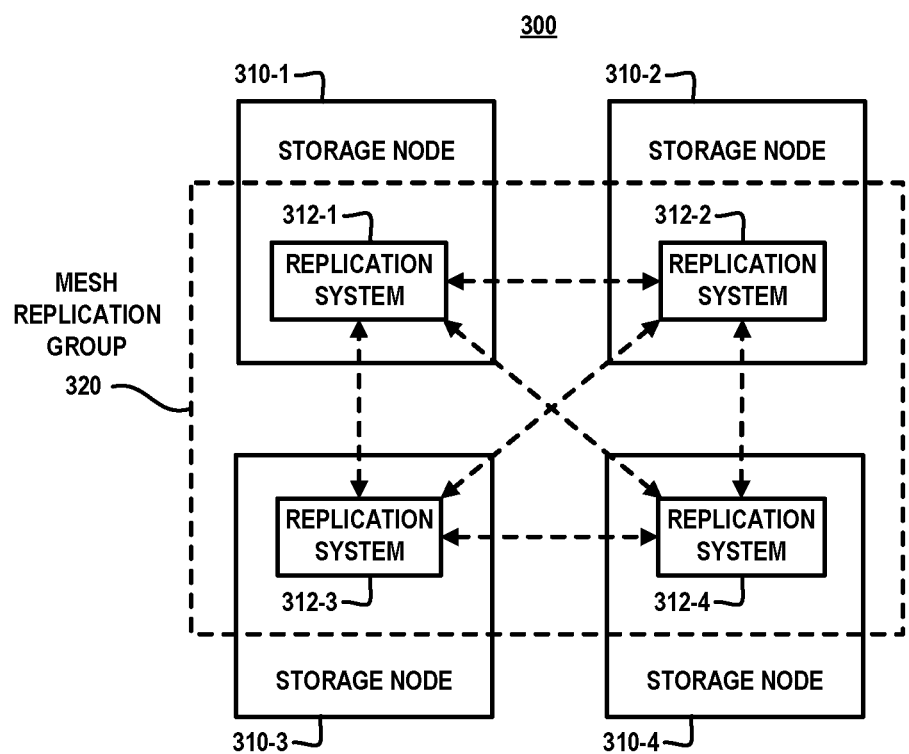
FIG. 3 schematically illustrates an exemplary connection topology between a plurality of software systems.

By way of example, a distributed replication system with multiple replication systems can be represented by a graph of nodes, wherein each node represents a replication system operating on a given storage node, and wherein an edge between two replication systems exists if the two replication systems communicate or otherwise interact to perform data replication. For example, FIG. 3 schematically illustrates an exemplary connection topology between a plurality of software systems. More specifically, FIG. 3 schematically illustrates a cluster of replication systems 300 which are configured in a mesh replication topology. In particular, FIG. 3 schematically illustrates a plurality of storage nodes 310-1, 310-2, 310-3, and 310-4, which host respective replication systems 312-1, 312-2, 312-3, and 312-4, which are part of a mesh replication group 320. In this exemplary scheme, there is a bidirectional edge (illustrated by dashed line arrows) from each replication system to every other replication system in the cluster of replication systems 300, providing a full mesh replication topology, wherein each replication system 312-1, 312-2, 312-3 and 314-4 in the mesh replication group 320 can store respective primary data blocks in a storage device of the respective storage node, and have replica data blocks stored in storage devices of every other storage node within the mesh replication group 320.

For example, the replication system 312-1 hosted by the storage node 310-1 can store primary data blocks in a storage device of the host storage node 310-1, and store replicas of the primary data blocks in storage devices of any of the other storage nodes 310-2, 310-3, and 310-4 by communication with the respective replication systems 312-2, 312-3, and 312-4. An advantage of using a full mesh replication topology in this instance is that replication operations can still be performed even when a given one of the storage nodes 310-1, 310-2, 310-3, and 310-4 and/or associated replication systems 312-1, 312-2, 313-3, and 312-4 crashes or otherwise drops off-line and is not accessible.

It is to be understood that while the exemplary embodiment of FIG. 3 shows a mesh replication topology with four replication systems 312-1, 312-2, 312-3, and 312-4, a mesh replication group can include more or less than four replication systems. Moreover, while FIG. 3 shows one mesh replication group 320 for ease of illustration and explanation, a data storage system could have multiple replication groups with member replication systems other than the member replication systems 312-1, 312-2, 312-3, and 312-4 of the mesh replication group 320. In addition, while FIG. 3 shows an exemplary embodiment of a mesh replication topology, other types of replication topologies can be implemented such as a "hub and spoke" topology in which primary data that originates in a "hub" replication system is replicated to multiple "spoke" replication systems.

Figure 4:
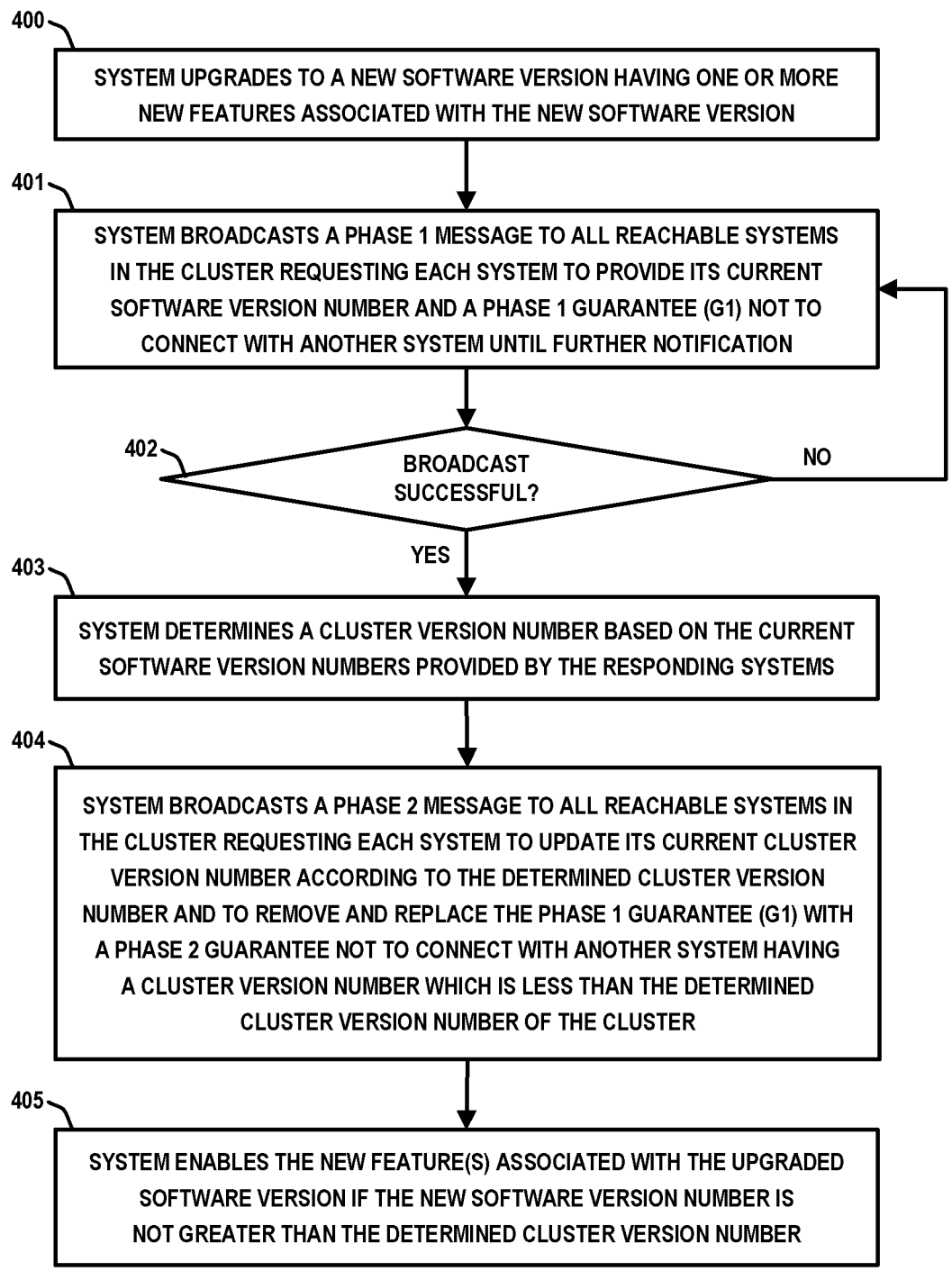
FIG. 4 illustrates a flow diagram of a method for managing a system upgrade operation, according to an exemplary embodiment of the disclosure.

FIG. 4 illustrates a flow diagram of a method for managing a system upgrade operation, according to an exemplary embodiment of the disclosure. More specifically, FIG. 4 illustrates an exemplary cluster version update process which is performed by a given system S1 under the control of an associated system upgrade control module which is invoked by the given system S1 to upgrade the software version of the given system S1. As an initial step, the system S1 performs an upgrade operation to upgrade to a new software version (denoted $V_{new}$) having one or more new features associated with the new software version $V_{new}$ (block 400). The system S1 then proceeds to perform a two-phase cluster version update process to determine if the new feature(s) associated with the upgraded version $V_{new}$ of the given system S1 can be enabled based on the current software version numbers of all systems that are "reachable" by the given system S1, and to ensure that all reachable systems within the cluster have compatible software versions to enable proper communication and interaction between the member systems of the cluster.

The two-phase cluster version update process guarantees that before each new feature of $V_{new}$ is enabled for the given system S1, each system in the cluster which is reachable by the given system S1 has a current software version number that is at least equal to $V_{new}$, and that the given system S will be allowed to, and eventually will, enable the new features when all systems that are reachable by the given system S1 have a current software version number that is at least equal to $V_{new}$. In addition, the two-phase cluster version update process guarantees that once the given system S1 enables the new feature(s) of $V_{new}$, there will never be another system S' in the cluster which is reachable from the given system S1 such that the version of S' is less than $V_{new}$. In some embodiments, a two-phase cluster version update process is performed as follows.

The system S1 broadcasts a first message (referred to herein as a phase 1 message) to all systems in the cluster which are reachable by the system S1, wherein the phase 1 message comprises a request for each system to provide (i) the current software version number ($V_{current}$) of the system, and (ii) a phase 1 guarantee G1 not to connect with another system until further notification from the system S1 that the phase 1 guarantee G1 can be removed (block 401). In some embodiments, the system S1 broadcasts the phase 1 message to each system that is logically connected to the S1, while the S1 does not know what other systems may be connected (and reached by S1) to the systems that are logically connected to S1.

The system S1 waits to receive a response to the phase 1 message which indicates that the phase 1 message broadcast was successful (block 402). In some embodiments, the broadcast will be deemed successful (affirmative determination in block 402) when the system S1 receives a response message from each system (e.g., one or more) that S1 directly sent the phase 1 message to (e.g., the systems) that S1 knows are logically connected to S1. On the other hand, in some embodiments, the broadcast will be deemed unsuccessful (negative determination in block 402) when, for example, the system S1 does not receive a response to its phase 1 message before the expiration of a given timeout period, or when the system S1 receives an error message from one or more of the systems that are directly connected to the system S1. The cluster version update process of FIG. 4 takes into consideration that a given system may receive the phase 1 message broadcast from S1 but that one or more physical and/or logical disconnections may occur at some point after the given system receives the phase 1 message but before the given system sends a response message in the path back to the system S1, thereby preventing the given system to provide a proper response the phase 1 message of S1.

For example, assume that at a given period of time a given cluster of systems has the following connection topology: S1↔S2↔S3↔S4, where the bidirectional arrows represent bidirectional edges (logical connections) between the respective systems S1, S2, S3, and S4. Assume further that S1 broadcasts a phase 1 message M1 to perform a cluster version update process. In this example, since S2 is the only system currently connected to S1, the phase 1 message M1 is sent directly to S2 from S1 (in other embodiments, two or more systems may be directly connected (logically) to S1 in which case S1 will broadcast the phase 1 message directly to the systems logically connected to S1).

In response to the phase 1 message M1, the system S2 will process the message (e.g., by determining its current software version number and providing a phase 1 guarantee G1 not to connect to another system until released from G1), and then forward the phase 1 message M1 to the system S3 (and other systems which may be directly connected to S2). In response to the phase 1 message M1, the system S3 will process the message (e.g., by determining its current software version number and providing a phase 1 guarantee G1 not to connect to another system until released from G1), and then forward the phase 1 message M1 to the system S4 (and other systems which may be directly connected downstream of S3). In response to the phase 1 message M1, the system S4 will process the message (e.g., by determining its current software version number and providing a phase 1 guarantee G1 not to connect to another system until released from G1).

In the exemplary connection topology, since no other system is connected downstream of S4, the system S4 will return a response message to S3 which includes the current software version number of S4. In response to the message received from S4, the system S3 will return a response message to S2 which includes the current software version numbers of S3 and S4. In response to the message received from S3, the system S2 will return a response message to S1 which includes the current software version numbers of S2, S3 and S4. Upon receiving the response message from S2, the system S1 will have the current software version numbers of all the systems S2, S3 and S4 in the cluster which are reachable from S1 at the given time (e.g., based on the exemplary connection topology S1↔S2↔S3↔S4). In this instance, the broadcast will be deemed successful (affirmative determination in block 402) when S1 receives the response message from S2, as the response message from S2 will represent a collective response message received from each system S2, S3, and S4 in the cluster which is currently reachable from S1.

On the other hand, considering the same exemplary connection topology: S1↔S2↔S3↔S4, assume that the systems S2 and S3 are disconnected (e.g., logically disconnected and/or physically disconnected) at some point in time after the system S2 forwards the phase 1 message M1 to the system S3. In this circumstance, even though the system S3 may process and forward the phase 1 message to the system S4, and receive a response message back from S4, the system S3 will not be able to send a response message back to the system S2 since the systems S2 and S3 are disconnected. As a result, the system S2 may send an error message to the system S1 in which case the system S1 deems the broadcast of the phase 1 message M1 to be unsuccessful (negative determination in block 402) and then broadcasts another phase 1 message M1 (block 401). In this instance, assuming that the systems S2 and S3 are logically disconnected, when the system S1 sends the phase 1 message M1 again to S2, the system S2 will process the message (e.g., by determining its current software version number and providing a phase 1 guarantee G1 not to connect to another system until released from G1), and then send a response message back to the system S1, since the system S3 is not logically connected to the system S2. In this instance, the system S1 will deem the broadcast to be successful (affirmative determination in block 402), since the system S1 received a response message from the system S2, which is the only reachable system from S1 at the given time.

When the system S1 determines that the broadcast of the phase 1 message is successful (affirmative determination in block 402), the system S1 will proceed to determine a cluster version number for the cluster based on the current software version numbers of the responding systems as provided in the response message received by the system S1 (block 403). For example, assuming that S1 received a response message back from S2 with information regarding the current software version numbers for S2, S3, and S4, the system S1 will proceed to determine a cluster version number for the cluster based on the current software version numbers of the responding systems S2, S3, and S4. In some embodiments, the system S1 determines a cluster version number for the cluster (in block 403) based on the lowest (oldest) software version number of the set of current software version numbers provided by the responding systems. For example, if the systems S1, S2, and S3 each have a software version number of 9.0, and the system S4 has a software version number of 8.0, the system S1 will set the cluster version number for the cluster to be 8.0, and the system S1 will update the value of its cluster version property according to the determined cluster version number (e.g., 8.0).

The system S1 then broadcasts a second message (referred to herein as a phase 2 message) to all reachable systems, wherein the phase 2 message comprises (i) a notification of the currently determined cluster version number and request for the system to update the value of its cluster_version property according to the determined cluster version number, and (ii) a request to remove the phase 1 guarantee (block 404). In this instance, each system which receives the phase 2 message is essentially "unlocked" or freed from the phase 1 guarantee. In some embodiments, the phase 2 message further comprises a request to remove and replace the phase 1 guarantee G1 with a phase 2 guarantee by the system not to connect with another system having a cluster version number which is less than the currently determined cluster version number. In some embodiments, the removal of the phase 1 guarantee is contingent on the acceptance of the phase 2 guarantee.

The system S1 will then proceed to enable the new feature(s) associated with the new software version $V_{new}$ if the new software version $V_{new}$ is not greater (not newer) than the determined cluster version number, i.e., the current value of the cluster_version property of S1 (block 405). For example, if the new software version $V_{new}$ is 9.0 and the determined cluster version number is 9.0 or greater, the system S1 can enable the new features(s) knowing that such new features will be compatible with the software versions of the systems in the cluster that are reachable by the system S1. On the other hand, if the new software version $V_{new}$ is 9.0, and the currently determined cluster version number is less than (older than) 9.0, the system S1 will not enable the new features(s) knowing that such new features will not be compatible with the software versions of the systems in the cluster that are reachable by the system S1. In some embodiments, the system S1 can send a request to each reachable system in the cluster having a software version number that is older than $V_{new}$ to upgrade its software version to $V_{new}$, so that the system S1 can eventually enable the new feature(s) of its upgraded software version $V_{new}$.

It is to be understood that the phase 1 and phase 2 messages which are broadcast as part of the cluster version update process can be broadcast using any suitable broadcast protocol. For example, in some embodiments, the phase 1 message is broadcast to all reachable systems using any suitable distributed depth-first search (DDFS) algorithm, such as the DDFS algorithm based on the message communication techniques as disclosed, for example, in the publication by H. R. Wiehle, entitled "A New Distributed Depth-First Search Algorithm," Information Processing Letters 20, 195, pages 147-150, which is incorporated herein by reference. In other embodiments, phase 1 and phase 2 messages can be broadcast using any suitable distributed bread-first search (BFS) algorithm in which a sequence of messages sent on any edge (bidirectional communication channel between neighboring nodes) in a given direction is received and processed in first-in-first-out (FIFO) order.

As noted above, the cluster version update process of FIG. 4 takes into account that at any given time during the cluster version update process, a given system may be physically and/or logically disconnected from the network at a given period of time such as (i) after receiving a phase 1 message but before responding to the phase 1 message, or (ii) after responding to the phase 1 message, but before receiving the phase 2 message to be unlocked or freed from the phase 1 guarantee given by the system in response to the phase 1 message. A physical network disconnection can occur for any number of reasons such as power failure of the host node on which the system executes, a network communications failure, or any other event which results in a given system being disconnected from the network for a temporary period.

In addition, a logical disconnection may occur in response to a user command to remove a given logical connection between two systems in the cluster. As a result of such logical and/or physical disconnection, a given system may still be obligated to a phase 1 guarantee to not connect to any system until the system is freed from the phase 1 guarantee. In such instance, the given system is locked from being able to connect to a new system, or otherwise connect a new system to the cluster, irrespective of whether the current software version of the new system is compatible with the current cluster version number. To address this issue, exemplary embodiments of the disclosure as discussed in further detail below in conjunction with FIGS. 5 and 6 include techniques to allow a given system, which is locked by a given phase 1 guarantee, to unlock itself by commencing a process to remove the phase 1 guarantee.

Figure 5:
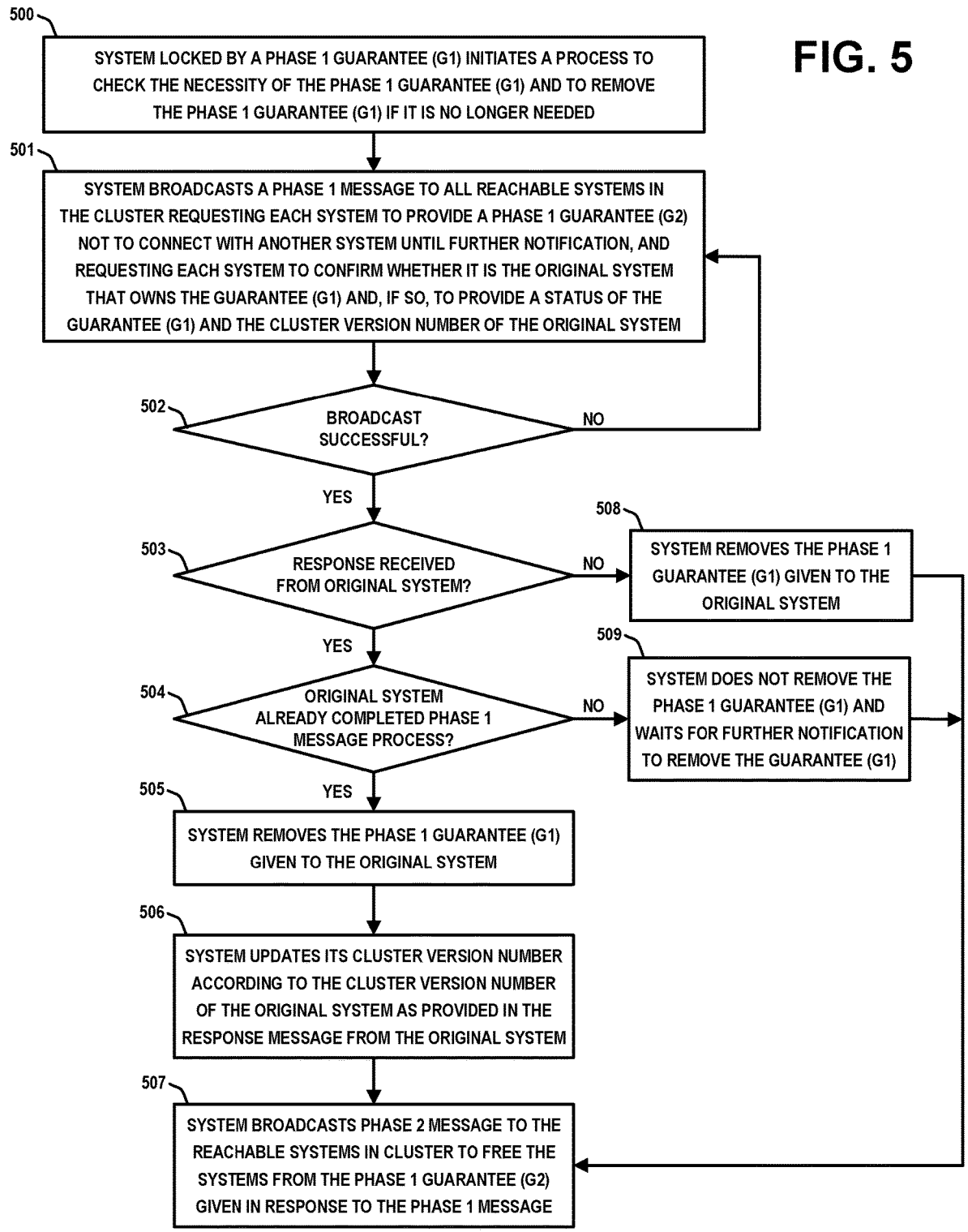
FIG. 5 illustrates a flow diagram of a method for enabling a system to be released from a guarantee, according to an exemplary embodiment of the disclosure.

FIG. 5 illustrates a flow diagram of a method for enabling a system to be released from a guarantee, according to an exemplary embodiment of the disclosure. More specifically, FIG. 5 illustrates a method that enables a given system to remove a phase 1 guarantee given to an original system in response to a phase 1 message, when the given system has not received a phase 2 message from the original system to remove the phase 1 guarantee. It is to be understood that the exemplary process of FIG. 5 is implemented in an exemplary embodiment in which the phase 1 messages are broadcast using a DDFS messaging algorithm. Referring to FIG. 5, a given system S', which is locked by the phase 1 guarantee G1 from an original system S1 initiates a process to check the necessity of the phase 1 guarantee G1 and to remove the phase 1 guarantee G1 if it is no longer needed (block 500). The system S' broadcasts a phase 1 message to all systems in the cluster which are reachable by the system S', wherein the phase 1 message comprises (i) a request for each system to provide a phase 1 guarantee (G2) not to connect with another system until further notification from the system S' that the phase 1 guarantee G2 can be removed, and (ii) a request for each system to confirm whether it is the original system S1 that owns the phase 1 guarantee G1 and, if so, a request for the original system S1 to provide a status of the phase 1 guarantee G1 and the value of the cluster_version property of the original system S1 (block 501).

The system S' waits to receive a response to the phase 1 message which indicates that the phase 1 message broadcast was successful (block 502). In some embodiments, the broadcast will be deemed successful (affirmative determination in block 502) when the system S' receives a response message from each system (e.g., one or more) that S' directly sent the phase 1 message to (e.g., the systems that S' knows are logically connected to S'). On the other hand, in some embodiments, the broadcast will be deemed unsuccessful (negative determination in block 502) when, for example, the system S' does not receive a response to its phase 1 message before the expiration of a given timeout period, or when the system S' receives an error message from one or more of the systems that are directly connected to the system S', in which case the system S' will send another phase 1 message (block 501).

When the system S' determines that the broadcast of a given phase 1 message is successful (affirmative determination in block 502), the system S' will determine if the received response message comprises a response from the original system S1 that owns the phase 1 guarantee G1 (block 502). If the system S' determines that a response has been received from the original system S1 (affirmative determination in block 503), the system S' will determine the status of the phase 1 guarantee G1 as provided by the original system S1. In some embodiments, the status of the status of the phase 1 guarantee G1 will be based on whether or not the original system S1 has completed the phase 1 message process associated with the phase 1 guarantee G1.

If the system S' determines (from the status information in the response message) that the original system S1 has completed the phase 1 message process associated with the phase 1 guarantee G1 (affirmative determination in block 504), the system S' will proceed to remove the phase 1 guarantee G1 (block 505), and then update its cluster version number (e.g., update the value of its cluster_version property) to be equal to the cluster version number of the original system S1 as provided by the original system S1 in the response to the phase 1 message (block 506). The system S' then proceeds to broadcast a phase 2 message to reachable systems in the cluster, wherein the phase 2 message comprises a request to remove the phase 1 guarantee G2 given in response to the phase 1 message (block 507). In this instance, each system which receives the phase 2 message is essentially "unlocked" or freed from the phase 1 guarantee G2 given to the system S' (in block 501).

On the other hand, if the system S' determines that a response has not been received from the original system (negative determination in block 503), the system S' will proceed to remove the phase 1 guarantee G1 previously given to the original system (block 508), and then proceed to broadcast a phase 2 message (block 507). In this instance, if the original system S1 was not reached by the phase 1 message broadcast by the system S', it means that the system S' does not need the phase 1 guarantee G1, so that the system S' can simply remove the phase 1 guarantee G1. In the event that the system S' is subsequently reachable from the original system S1, then it will be tantamount to a new connection, in which case a cluster version update process may result in compatibility of the cluster version numbers of the system S' and S1.

Furthermore, if the system S' determines that a response has been received from the original system S1 (affirmative determination in block 503), but the system S' determines (from the status information in the response message) that the original system S1 has not yet completed the phase 1 message process associated with the phase 1 guarantee G1

(negative determination in block 504), the system S' will not remove the phase 1 guarantee G1, but will wait for further notification from the original system S1 to remove the phase 1 guarantee G1 (block 509), and then proceed to broadcast a phase 2 message (block 507). In this instance, it is assumed that the original system S1 will soon successfully complete phase 1 of the cluster version update process and send a phase 2 message to release the system S' from the pending phase 1 guarantee.

Since the exemplary process of FIG. 5 utilizes a standard DDFS message protocol to broadcast phase 1 messages, each system that holds the same phase 1 guarantee requested by given system will need to perform the process of FIG. 5 to be released from the phase 1 guarantee. For example, assume in the exemplary connection topology S1↔S2↔S3↔S4 that the systems and S2 are disconnected (e.g., logically disconnected and/or physically disconnected) at some point in time after a phase 1 message with a phase 1 guarantee G1, which was initially broadcast by the system S1, has reached all the systems S2, S3 and S4 such that all the systems S2, S3 and S4 are locked by the same phase 1 guarantee G1. With the DDFS process, each system S2, S3 and S4 would have to perform the process of FIG. 5 to remove the phase 1 guarantee G1, while ensuring that the cluster version number they receive is not smaller than what is the actual cluster version number.

In other embodiments as discussed below in conjunction with FIG. 6, a method is provided which enables a given system to remove a phase 1 guarantee given to an original system, while also allowing the given system to broadcast a phase 2 message to other systems which may be locked by the same phase 1 guarantee to notify such systems that the given phase 1 guarantee is no longer needed and that such systems can be released from the given phase 1 guarantee by replacing the phase 1 guarantee with the cluster version number that the given system received from the original system in response to the phase 1 message. This process eliminates the need for each system to perform their own process (e.g., FIG. 5) to be released from the given phase 1 guarantee, and thereby minimizes the amount of messaging in the cluster. To enable this process, the following property should be maintained: (i) assume that M1 is a phase 1 message that arrived to system X; and (ii) assume that M2 is a phase 1 message that was initiated by system X after M1 arrived to system X, the guarantee release process should ensure that the cluster version number determined as a result of M2 will be equal to or greater than the cluster version number determined as a result of M1. If this property is guaranteed, then the given system X can notify other systems to release the same phase 1 guarantee held by system X.

Figure 6:
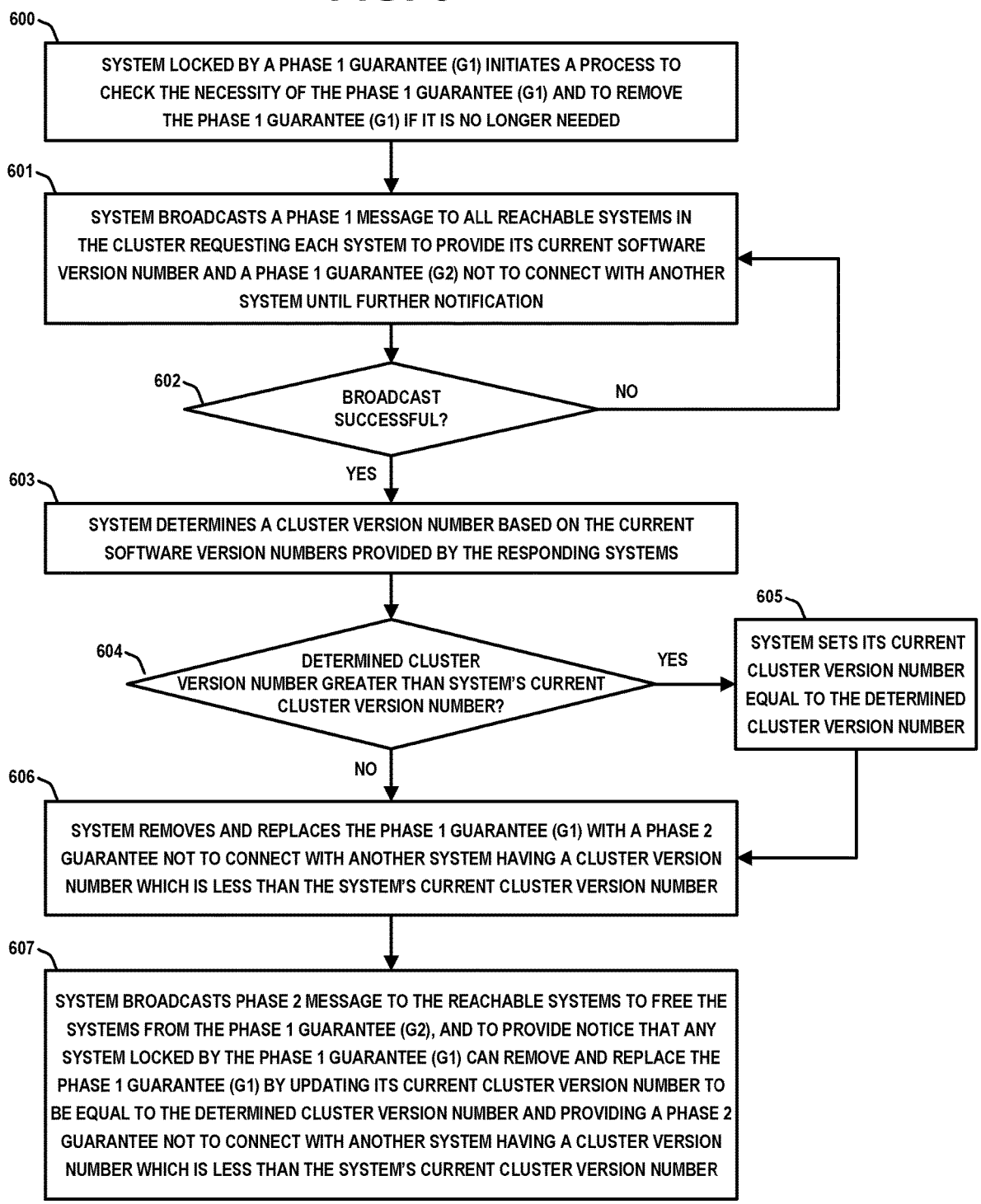
FIG. 6 illustrates a flow diagram of a method for enabling a system to be released from a guarantee, according to another exemplary embodiment of the disclosure.

FIG. 6 illustrates a flow diagram of a method for enabling a system to be released from a guarantee, according to an exemplary embodiment of the disclosure. More specifically, FIG. 6 illustrates a method that enables a given system to remove a phase 1 guarantee given to an original system in response to a phase 1 message, when the given system has not received a phase 2 message from the original system to remove the phase 1 guarantee. It is to be understood that the exemplary process of FIG. 6 is implemented in an exemplary embodiment in which the phase 1 messages are broadcast using a distributed BFS messaging algorithm and FIFO message processing on the communication channels between neighboring systems (nodes). The exemplary process of FIG. 6 is based on the premise that when a given system S' issues a phase 1 message to initiate the process of being released from a given phase 1 guarantee, it is ensured that the cluster version number determined by the system S' will be at least equal to or greater than the cluster version that would have been determined by the original system S which issued the previous phase 1 message that requested the given phase 1 guarantee which currently locks the system S' from connecting to another system.

Referring to FIG. 6, the given system S', which is locked by the phase 1 guarantee G1 from an original system S1 initiates a process to check the necessity of the phase 1 guarantee G1 and to remove the phase 1 guarantee G1 if it is no longer needed (block 600). The system S' broadcasts a phase 1 message to all systems in the cluster which are reachable by the system S', wherein the phase 1 message comprises a request for each system to provide (i) the current software version number of the system, and (ii) a phase 1 guarantee G2 not to connect with another system until further notification from the system S' that the phase 1 guarantee G1 can be removed (block 601). Again, the given system S' broadcasts the phase 1 message to each system that is logically connected to the given system S', while S' does not know what other systems may be connected (and reached by S') to the systems that are logically connected to S'.

The system S' waits to receive a response to the phase 1 message which indicates that the phase 1 message broadcast was successful (block 602). In some embodiments, the broadcast will be deemed successful (affirmative determination in block 602) when the system S' receives a response message from each system (e.g., one or more) that S' directly sent the phase 1 message to (e.g., the systems that S' knows are logically connected to S'). On the other hand, in some embodiments, the broadcast will be deemed unsuccessful (negative determination in block 602) when, for example, the system S' does not receive a response to its phase 1 message before the expiration of a given timeout period, or when the system S' receives an error message from one or more of the systems that are directly connected to the system S', in which case the system S' will send another phase 1 message (block 601).

When the system S' determines that the broadcast of a given phase 1 message is successful (affirmative determination in block 602), the system S' will proceed to determine a cluster version number for the cluster based on the current software version numbers of the responding systems as provided in the response message received by the system S' (block 603). In some embodiments, the system S' determines a cluster version number for the cluster based on the lowest (oldest) software version number of the set of current software version numbers provided by the responding systems. The system S' then determines whether the determined cluster version number is greater than the current cluster version number (i.e., current value of the cluster_version property) of the system S' (block 604). If the system S' determines that the currently determined cluster version number is greater than the current cluster version number of the system S' (affirmative determination in block 604), the system S' will set the value of its cluster_version property to the determined cluster version number (block 605). If the system S' determines that the currently determined cluster version number is not greater than the current cluster version number of the system S' (negative determination in block 604), the system S' will not change the value of its cluster_version property.

The system S' then proceeds to remove and replace the phase 1 guarantee G1 with a phase 2 guarantee not to connect with another system having a cluster version number which is less than the current cluster version number of the system S' (block 606). The system S' then broadcasts a phase 2 message to the reachable systems in the cluster, wherein the phase 2 message comprises (i) a request to remove the phase 1 guarantee G2 given in response to the phase 1 message, and (ii) a notification that any system locked by the phase 1 guarantee G1 can remove and replace the phase 1 guarantee G1 by the system updating its current cluster version numbers to be equal to the currently determined cluster version number, and providing a phase 2 guarantee not to connect with another system having a cluster version number which is less than the system's current (updated) cluster version number (block 607). In this instance, each system which receives the phase 2 message is essentially "unlocked" or freed from the phase 1 guarantee G2 given to the system S'(in block 601) as well as the same phase 1 guarantee G2 previously given to the original system.

As noted above, the process of FIG. 6 is premised on the messages being broadcast using a distributed BFS messaging algorithm and FIFO message processing on the communication channels between neighboring systems (nodes), to ensure the desired property that the cluster version number determined by the system S' (in block 603) will be at least equal to or greater than the cluster version number that would have been determined by the original system which holds the phase 1 guarantee G1 which currently locks the system S' (and possible other systems in the cluster). With BFS and FIFO, when a given phase 1 message M arrives to a given system S on a given communication channel C, the given system S will determine if it has already received the given message M. If the system S has already received the given message M, the system S returns some neutral response on the communication channel C and finishes processing of the message M. If the system S has not previously received the given message M, the system S will set a local parameter which indicates that the message M has been received, process the message M, and then forward the message M on all channels (edges) connected to the system S. When the system S receives a response message from all systems connected to the channels one which the system S forwarded the message M, the system S will send a response message on the communication channel back to the system which provided the message M.

Figure 7:
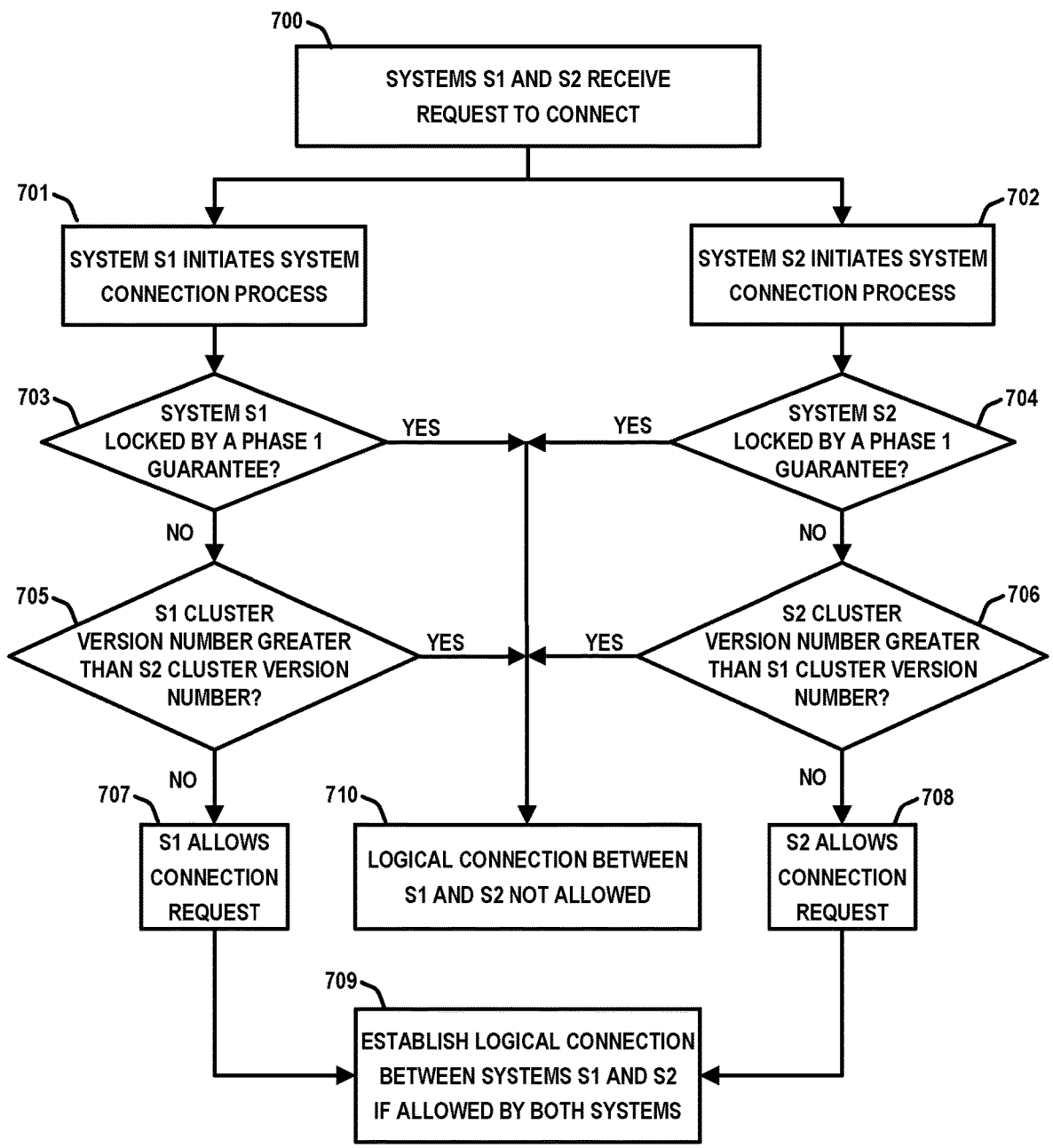
FIG. 7 illustrates a flow diagram of a method to establish a logical connection between systems, according to an exemplary embodiment of the disclosure.

FIG. 7 illustrates a flow diagram of a method to establish a logical connection between systems, according to an exemplary embodiment of the disclosure. In particular, FIG. 7 illustrates a process flow which is performed by two systems (e.g., systems S1 and S2) to determine if the two systems are allowed to logically connect to each other in a cluster. For example, assume that the two systems S1 and S2 receive a request (from a client or user) to logically connect (block 700). The system S1 initiates a system connection process (block 701) and the system S2 initiates a system connection process (block 702). As part of the system connection process the system S1 determines if it is currently locked by a phase 1 guarantee (block 703), and the system S2 determines if it is currently locked by a phase 1 guarantee (block 704). If either system S1 or S2 (or both) are currently locked by any phase 1 guarantee (affirmative determination in block 703 and/or block 704), the logical connection between the two systems S1 and S2 is not allowed (block 710), and the client/user request for logically connecting S1 and S2 will be denied.

On the other hand, if neither system S1 nor S2 is currently locked by any phase 1 guarantee (negative determination in block 703 and block 704), the system S1 determines if its cluster version number is greater than the cluster version number of S2 (block 705), and the system S2 determines if its cluster version number is greater than the cluster version number of S1 (block 706). If either system S1 or S2 determines that its cluster version number is greater than the cluster version number of the other system (affirmative determination in block 705 or block 706), the logical connection between the two systems S1 and S2 is not allowed (block 710), and the client/user request for logically connecting S1 and S2 will be denied. On the other hand, if the system S1 determines that its cluster version number is not greater than the cluster version number of S2 (negative determination in block 705), the system S1 will allows the connection request (block 707). Similarly, if the system S2 determines that its cluster version number is not greater than the cluster version number of S1 (negative determination in block 706), the system S2 will allows the connection request (block 708). If both systems S1 and S2 allow the connection request, the client/user request will be granted to establish a logical connection between the two systems S1 and S2 (block 709).

It is to be noted that a client/user request to remove a logical connection between two systems is granted without conditions. For example, assume that the two systems S1 and S2, which are logically connected, receive a request (from a client or user) to logically disconnect, e.g., by removing a bidirectional edge (communication channel) between two nodes (systems S1 and S2) in a node graph associated with a given cluster of systems. Then edge removal process is performed without any conditions or verifications, such that the systems will simply logically disconnect.

Figure 8:
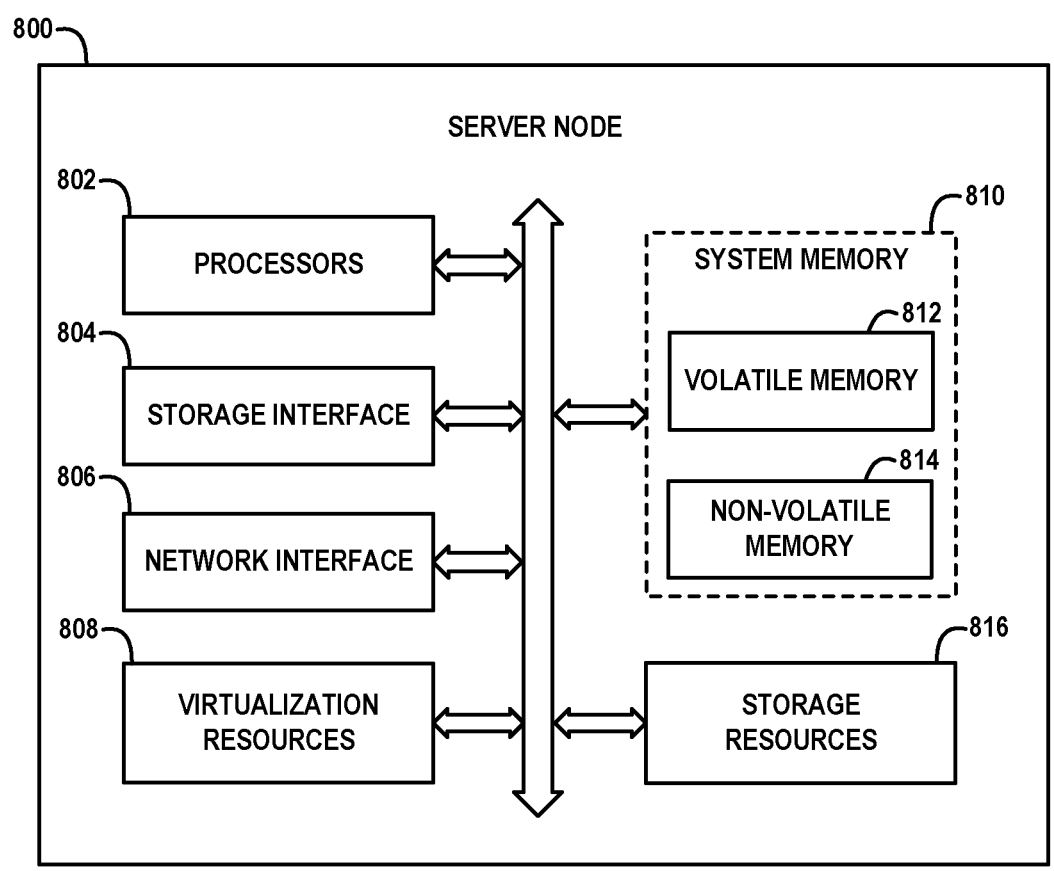
FIG. 8 schematically illustrates a framework of a node for hosting a software system and an associated system upgrade control module, according to an exemplary embodiment of the disclosure.

FIG. 8 schematically illustrates a framework of a node for hosting a software system and an associated system upgrade control module, according to an exemplary embodiment of the disclosure. More specifically, FIG. 8 schematically illustrates an exemplary hardware architecture of a host node (e.g., server node) in the network computing system 100 of FIG. 1. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of a system upgrade control module as discussed herein. In some embodiments, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well as execute one or more of the various modules and functionalities of a system upgrade control module as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components system upgrade control modules (as shown in FIGS. 1 and 2) and the system upgrade management functions discussed herein (e.g., FIGS. 4, 5, 6, and 7) are implemented using program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile system memory 812 is configured as the highest-level memory tier, and the non-volatile system memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
managing, by a first system, an upgrade of the first system within a cluster of systems comprising the first system and one or more other systems, which communicate in a network computing environment to implement a distributed application, wherein managing the upgrade of the first system comprises:
performing, by the first system, an upgrade operation to upgrade a current software version of the first system to a new software version which comprises a new feature;
performing, by the first system, a cluster version update process which comprises (i) communicating with at least one other system in the cluster to obtain respective current software version numbers of each of the one or more other systems in the cluster, and obtain a respective first guarantee from each system of the one or more other systems to not connect with another system until the first guarantee, which is provided to the first system by each system of the one or m ore other systems, is removed, and (ii) utilizing the current software version numbers of the one or more other systems in the cluster to determine a cluster version number of the cluster; and
enabling, by the first system, the new feature of the new software version, in response to the first system determining that a software version number of the new software version is not greater than the determined cluster version number of the cluster.

2. The method of claim 1, wherein communicating with the at least one other system in the cluster, comprises:
broadcasting, by the first system, a first message to the at least one other system in the cluster, wherein the first message comprises (i) a request for the one or more other systems in the cluster to return their respective current software version numbers, and (ii) a request for the first guarantee not to connect with another system until further notification from the first system that the first guarantee can be removed.

3. The method of claim 1, wherein the cluster version number is determined to be a lowest software version number of the current software version numbers returned from the one or more other systems in the cluster.

4. The method of claim 1, wherein performing the cluster version update process further comprises broadcasting, by the first system, a second message to the at least one other system in the cluster, wherein the second message comprises (i) a notification of the determined cluster version number, and request for the at least one other system to update a current cluster version number of the at least one other system according to the determined cluster version number, and (ii) a request to remove the first guarantee given to the first system.

5. The method of claim 4, wherein the second message further comprises a request for the at least one other system to provide a second guarantee not to connect with another system which has a cluster version number that is less than the cluster version number of the at least one other system as updated to the determined cluster version number.

6. The method of claim 1, further comprising:
deferring enabling, by the first system, the new feature of the new software version number, in response to the first system determining that the new software version number is greater than the determined cluster version number of the cluster; and
sending, by the first system, a request to another system in the cluster to upgrade to a software version number which is at least equal to the new software version number of the first system.

7. The method of claim 1, wherein the cluster of systems comprises data replication systems, and wherein the distributed application comprises a distributed replication application implemented on data storage nodes in the network computing environment.

8. The method of claim 1, further comprising:
providing, by the first system, a second guarantee to a second system in the cluster not to connect with another system until further notification from the second system that the second guarantee can be removed; and
prior to the first system receiving the notification from the second system that the second guarantee can be removed, performing, by the first system, a self-removal process to remove the second guarantee provided to the second system.

9. The method of claim 8, wherein performing the self-removal process by the first system to remove the second guarantee provided to the second system, comprises:
broadcasting, by the first system, a first message to one or more other systems in the cluster, wherein the first message comprises (i) a request for the one or more other systems to return their respective current software version numbers, and (ii) a request for a guarantee by the one or more other systems in the cluster not to connect with another system until further notification from the first system that the guarantee can be removed;
utilizing, by the first system, the current software version numbers returned from the one or more other systems in the cluster to determine the cluster version number of the cluster as a lowest software version number of the current software version numbers returned from the one or more other systems in the cluster;
setting, by the first system, a current cluster version number of the first system to be equal to the determined cluster version number;
removing, by the first system, the second guarantee provided to the second system by the first system, conditioned on the first system providing a guarantee not to connect with another system having a cluster version number which is less than the current cluster version number of the first system; and
broadcasting, by the first system, a second message to the one or more other systems in the cluster, wherein the second message comprises (i) a request to remove the guarantee given by the one or more other systems to the first system and (ii) a notification that any given system locked by the same second guarantee provided to the second system by the given system can remove and replace the same second guarantee by the given system updating its current cluster version number to be equal to the currently determined cluster version number, and providing a guarantee not to connect with another system having a cluster version number which is less than the updated cluster version number of the system.

10. An article of manufacture comprising a non-transitory processor-readable storage medium having stored therein program code of one or more software programs, wherein the program code is executable by one or more processors to implement a method which comprises:

managing, by a first system, an upgrade of the first system within a cluster of systems comprising the first system and one or more other systems, which communicate in a network computing environment to implement a distributed application, wherein managing the upgrade of the first system comprises:

performing, by the first system, an upgrade operation to upgrade a current software version of the first system to a new software version which comprises a new feature;

performing, by the first system, a cluster version update process which comprises (i) communicating with at least one other system in the cluster to obtain respective current software version numbers of each of the one or more other systems in the cluster, and obtain a respective first guarantee from each system of the one or more other systems to not connect with another system until the first guarantee, which is provided to the first system by each system of the one or more other systems, is removed, and (ii) utilizing the current software version numbers of the one or more other systems in the cluster to determine a cluster version number of the cluster; and enabling, by the first system, the new feature of the new software version, in response to the first system determining that a software version number of the new software version is not greater than the determined cluster version number of the cluster.

11. The article of manufacture of claim 10, wherein the program code for communicating with at least one other system in the cluster comprises program code for:

broadcasting, by the first system, a first message to the at least one other system in the cluster, wherein the first message comprises (i) a request for the one or more other systems in the cluster to return their respective current software version numbers, and (ii) a request for the first guarantee not to connect with another system until further notification from the first system that the first guarantee can be removed.

12. The article of manufacture of claim 10, wherein the cluster version number is determined to be a lowest software version number of the current software version numbers returned from the one or more other systems in the cluster.

13. The article of manufacture of claim 10, wherein the program code for performing the cluster version update process further comprises program code for broadcasting, by the first system, a second message to the at least one other system in the cluster, wherein the second message comprises (i) a notification of the determined cluster version number, and request for the at least one other system to update a current cluster version number of the at least one other system according to the determined cluster version number, and (ii) a request to remove the first guarantee given to the first system.

14. The article of manufacture of claim 13, wherein the second message further comprises a request for the at least one other system to provide a second guarantee not to connect with another system which has a cluster version number that is less than the cluster version number of the at least one other system as updated to the determined cluster version number.

15. The article of manufacture of claim 10, wherein the cluster of systems comprises data replication systems, and wherein the distributed application comprises a distributed replication application implemented on data storage nodes in the network computing environment.

16. The article of manufacture of claim 10, further comprising program code for:

providing, by the first system, a second guarantee to a second system in the cluster not to connect with another system until further notification from the second system that the second guarantee can be removed; and prior to the first system receiving the notification from the second system that the second guarantee can be removed, performing, by the first system, a self-removal process to remove the second guarantee provided to the second system;

wherein performing the self-removal process by the first system to remove the second guarantee provided to the second system, comprises:

broadcasting, by the first system, a first message to one or more other systems in the cluster, wherein the first message comprises (i) a request for the one or more other systems to return their respective current software version numbers, and (ii) a request for a guarantee by the one or more other systems in the cluster not to connect with another system until further notification from the first system that the guarantee can be removed;

utilizing, by the first system, the current software version numbers returned from the one or more other systems in the cluster to determine the cluster version number of the cluster as a lowest software version number of the current software version numbers returned from the one or more other systems in the cluster;

setting, by the first system, a current cluster version number of the first system to be equal to the determined cluster version number;

removing, by the first system, the second guarantee provided to the second system by the first system, conditioned on the first system providing a guarantee not to connect with another system having a cluster version number which is less than the current cluster version number of the first system; and broadcasting, by the first system, a second message to the one or more other systems in the cluster, wherein the second message comprises (i) a request to remove the guarantee given by the one or more other systems to the first system and (ii) a notification that any given system locked by the same second guarantee provided to the second system by the given system can remove and replace the same second guarantee by the given system updating its current cluster version number to be equal to the currently determined cluster version number, and providing a guarantee not to connect with another system having a cluster version number which is less than the updated cluster version number of the system.

17. A network computing system, comprising:

a plurality of physical server machines which are connected in a network, and which host respective systems of a cluster of systems comprising a first system and one or more other systems, which communicate to implement a distributed application;

wherein the first system in the cluster of systems is configured to manage a software upgrade of the first system, wherein in managing the software upgrade, the first system is configured to:

perform an upgrade operation to upgrade a current software version of the first system to a new software version which comprises a new feature;

perform a cluster version update process which comprises (i) communicating with at least one other system in the cluster to obtain respective current software version numbers of each of the one or more other systems in the cluster, and obtain a respective first guarantee from each system of the one or more other systems to not connect with another system until the first guarantee, which is provided to the first system by each system of the one or more other systems, is removed, and (ii) utilizing the current software version numbers of the one or more other systems in the cluster to determine a cluster version number of the cluster; and enable the new feature of the new software version, in response to the first system determining that a software version number of the new software version is not greater than the determined cluster version number of the cluster.

18. The network computing system of claim 17, wherein in performing the cluster version update process, the first system is configured to:

broadcast a first message to the at least one other system in the cluster, wherein the first message comprises (i) a request for the one or more other systems in the cluster to return their respective current software version numbers, and (ii) a request for a first guarantee not to connect with another system until further notification from the first system that the first guarantee can be removed; and broadcast a second message to the at least one other system in the cluster, wherein the second message comprises (i) a notification of the determined cluster version number and request for the at least one other system to update a current cluster version number of the at least one other system according to the determined cluster version number, and (ii) a request to remove the first guarantee given to the first system.

19. The network computing system of claim 18, wherein the second message further comprises a request for the at least one other system to provide a second guarantee not to connect with another system which has a cluster version number that is less than the cluster version number of the at least one other system as updated to the determined cluster version number.

20. The network computing system of claim 17, wherein the first system is further configured to:

provide a second guarantee to a second system in the cluster not to connect with another system until further notification from the second system that the second guarantee can be removed; and perform a self-removal process to remove the second guarantee provided to the second system, prior to the first system receiving the notification from the second system that the second guarantee can be removed;

wherein in performing the self-removal process by the first system to remove the second guarantee provided to the second system, the first system is configured to:

broadcast a first message to one or more other systems in the cluster, wherein the first message comprises (i) a request for the one or more other systems to return their respective current software version numbers, and (ii) a request for a guarantee bar the one or more other systems in the cluster not to connect with another system until further notification from the first system that the guarantee can be removed;

utilize the current software version numbers returned from the one or more other systems in the cluster to determine the cluster version number of the cluster as a lowest software version number of the current software version numbers returned from the one or more other systems in the cluster;

set a current cluster version number of the first system to be equal to the determined cluster version number;

remove the second guarantee provided to the second system by the first system, conditioned on the first system providing a guarantee not to connect with another system having a cluster version number which is less than the current cluster version number of the first system; and broadcast a second message to the one or more other systems in the cluster, wherein the second message comprises (i) a request to remove the guarantee given by the one or more other systems to the first system and (ii) a notification that any given system locked by the same second guarantee provided to the second system bar the given system can remove and replace the same second guarantee by the given system updating its current cluster version number to be equal to the currently determined cluster version number, and providing a guarantee not to connect with another system having a cluster version number which is less than the updated cluster version number of the system.

21. A method, comprising:

managing, by a first system, an upgrade of the first system within a cluster of systems comprising the first system and one or more other systems, which communicate in a network computing environment to implement a distributed application;

wherein managing the upgrade of the first system comprises:

performing, by the first system, an upgrade operation to upgrade a current software version of the first system to a new software version which comprises a new feature;

performing, by the first system, a cluster version update process to communicate with the one or more other systems in the cluster to determine a cluster version number of the cluster; and enabling, by the first system, the new feature of the new software version, in response to the first system determining that a software version number of the new software version is not greater than the determined cluster version number of the cluster; and wherein performing the cluster version update process, comprises:

broadcasting, by the first system, a first message to the one or more other systems in the cluster, wherein the first message comprises (i) a request for the one or more other systems in the cluster to return their respective current software version numbers, and (ii) a request for a guarantee not to connect with another system until further notification from the first system that the guarantee can be removed; and utilizing, by the first system, the current software version numbers returned from the one or more other systems in the cluster to determine the cluster version number of the cluster.

* * * * *